Jan. 1, 1952 R. H. CARSON 2,581,172
VANE TYPE HYDRAULIC TRANSMISSION
Filed Aug. 16, 1947 4 Sheets-Sheet 1

INVENTOR.
Robert H. Carson
BY
Popp and Popp
Attorneys.

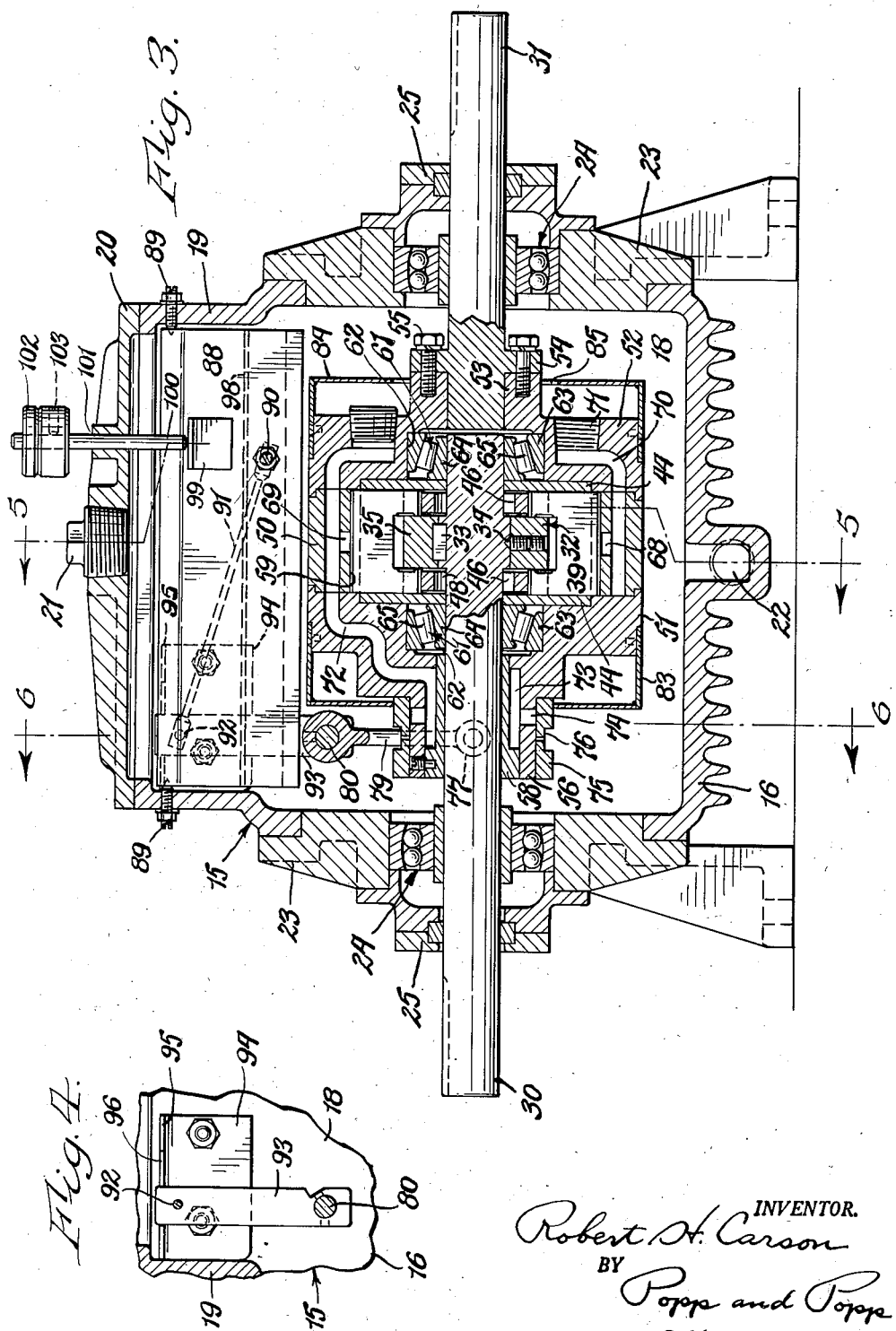

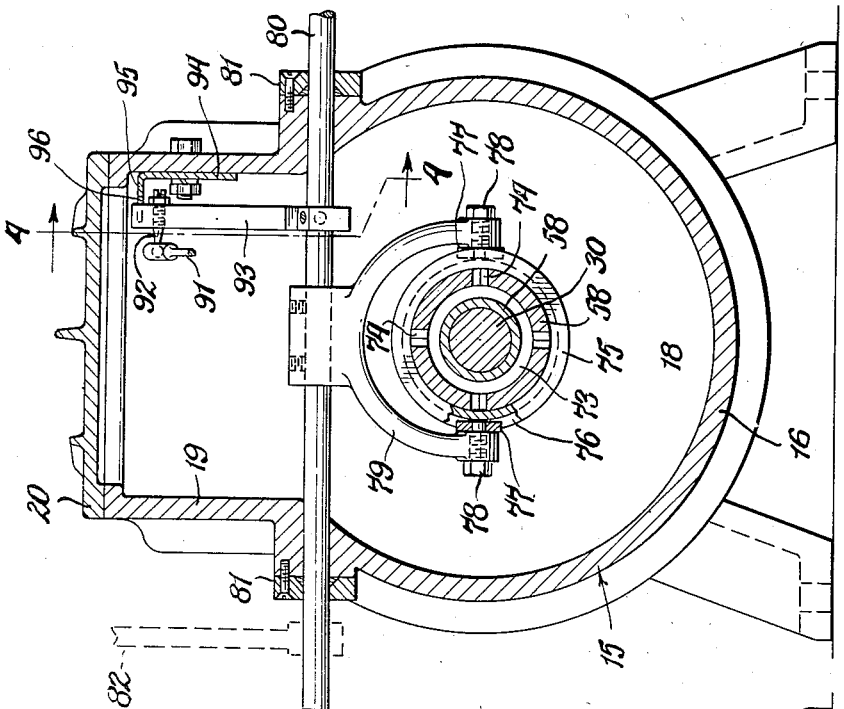
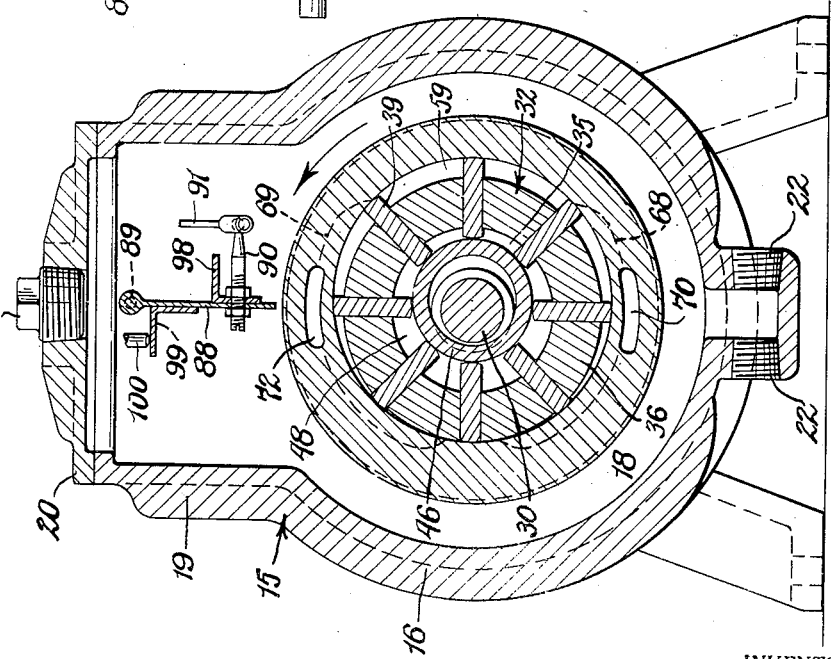

Jan. 1, 1952 R. H. CARSON 2,581,172
VANE TYPE HYDRAULIC TRANSMISSION
Filed Aug. 16, 1947 4 Sheets-Sheet 4
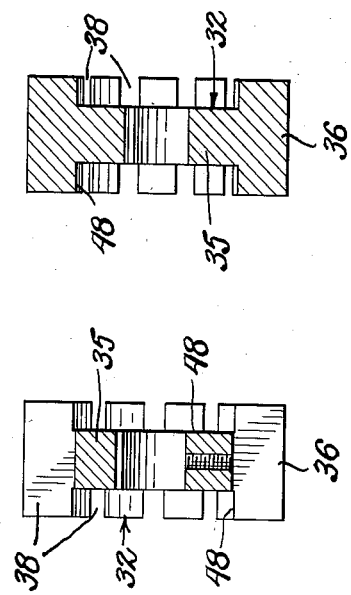
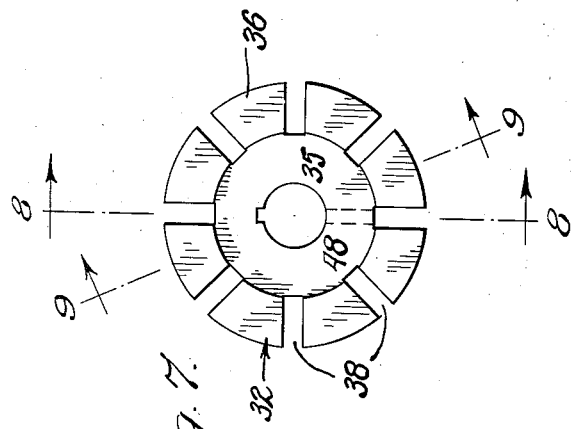
INVENTOR.
Robert H Carson
BY Popp and Popp
Attorneys.

Patented Jan. 1, 1952

2,581,172

UNITED STATES PATENT OFFICE 2,581,172

VANE TYPE HYDRAULIC TRANSMISSION

Robert H. Carson, Niagara Falls, N. Y., assignor to Chisholm-Ryder Company, Incorporated, Niagara Falls, N. Y., a corporation of New York Application August 16, 1947, Serial No. 768,953

9 Claims. (Cl. 192—58)

This invention relates to a hydraulic transmission whereby varying rates of speed can be obtained between the driving and driven shafts of any mechanism, and more particularly to such a transmission which can be used in the drive for heavy duty plant machinery.

One of the principal objects of the invention is to provide such a heavy duty transmission which is capable of transmitting heavy loads without substantial slippage or power loss and can be regulated to provide any desired output speed.

Another object is to provide such a transmission which is very sensitive in its regulation of its output speed and in which such regulation can be effected with ease.

Another object is to provide such a heavy duty hydraulic transmission which is of simple construction and which will stand up under conditions of severe and constant use without getting out of order or requiring repairs.

Another object is to provide such a hydraulic transmission in which provision is made for compensating for the expansion and contraction of the working fluid due to temperature changes.

Another object is to provide such a transmission which is very compact in proportion to the power it is capable of transmitting.

Another aim is to provide such a transmission in which all bearing loads, part stresses and pressures are well within safe limits.

Another purpose is to provide a simple and reliable form of governor for maintaining a constant output speed at any setting thereof.

Another object is to provide such a transmission which is readily assembled and disassembled and which requires a minimum amount of machining to produce the various parts of the transmission.

Another object is to provide such a transmission in which there is little danger of leakage of the working liquid.

Another object is to provide a hydraulic transmission, including a pump rotating in a body of liquid in a casing and connecting the input and output shafts of the transmission, in which all radial and axial forces developed within the pump are resisted by a pair of bearings within said pump thereby to avoid the necessity of large bearings between the shafts or pumps and the casing to resist such forces.

Other objects and advantages of the invention will appear from the following description and drawings in which:

Fig. 3 is a vertical longitudinal central section therethrough taken on line 3—3, Fig. 2.

Fig. 4 is a fragmentary vertical sectional view taken on line 4—4, Fig. 6.

Figs. 5 and 6 are vertical cross-sectional views taken on the correspondingly numbered lines of Fig. 3.

Fig. 7 is a side elevational view of the pump head which carries the operating vanes of the transmission.

Figs. 8 and 9 are sectional views taken on the correspondingly numbered lines of Fig. 7.

Fig. 10 is an enlarged perspective view of one of the vanes of the transmission.

Figure 1:
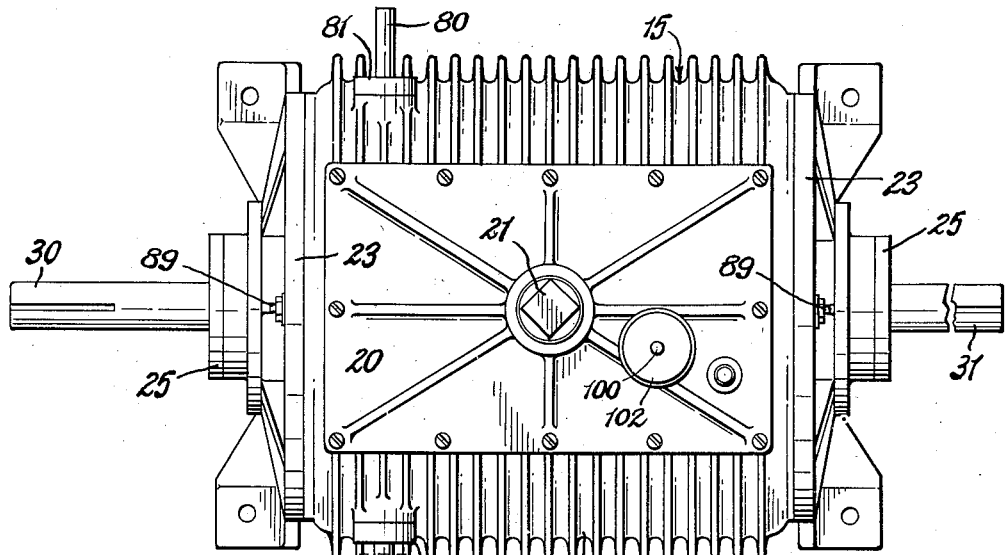
Fig. 1 is a top plan view of a hydraulic transmission embodying the present invention.
Figure 2:
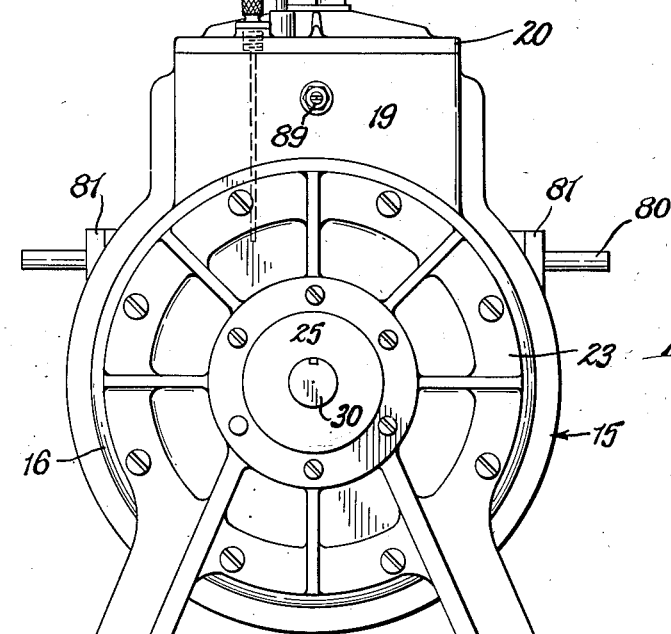
Fig. 2 is an end elevational view thereof.

The transmission is shown as housed within a casing 15 which can be of any suitable construction and is shown as having a generally cylindrical lower part 16 which forms a generally cylindrical chamber 18 and a generally rectangular upper part 19 which forms a reservoir for the oil or other working liquid with which the casing is partly filled. The generally rectangular upper part 19 is shown as provided with a cover 20 having a filling plug 21 and drain plugs 22 are shown as provided in the bottom of the generally cylindrical lower part 16.

The ends of the generally cylindrical lower part 16 are shown as closed by circular end heads 23 removably secured in any suitable manner and each carrying an antifriction bearing 24 and oil seal 25. The casing parts 16, 20 and 23 can be provided with an extended or finned external surface as shown to dissipate the heat generated by the operation of the transmission and to strengthen these parts.

A drive or input shaft 30 is journaled in one of the antifriction bearings 24 and a driven or output shaft 31 is journaled in the other antifriction bearing 24, these shafts being in line with each other. Within the casing 16 a pump head 32 is fixed to the driving or input shaft 30, this being shown as effected by a key 33 and set screw 34. As best shown in Figs. 7–9, the hub 35 of this pump head 32 is relatively narrow in an axial direction while its rim 36 is comparatively thick in an axial direction. Also as shown in these figures, the relatively thick rim 36 of the pump head is radially slotted at spaced intervals, as indicated at 38, to receive a plurality of vanes 39 which work radially in and out of the slots 38 and are guided and held thereby.

As best shown in Fig. 10, each vane 39 is provided with parallel end faces 40, these faces, in assembled relation with the pump head 32, being arranged coplanar with the end faces of its thick rim 36. The radially outward face 41 of each vane 39 is rounded and the opposite or inner end of each vane is bifurcated to provide two legs 42 which straddle and fit the opposite faces of the comparatively thin hub 35 of the pump head 32. The inner corners of each of these legs 42 is preferably beveled or chamfered, as indicated at 43, to aid in lubrication and the opposing faces of the legs 42 are closely fitted to the opposite faces of the comparatively thin hub 35 to be guided thereby in the radial movements of the vanes in the slots 38.

To provide further guides for the vanes 39 in their radial movements, end rings or disks 44 are secured against the opposite end faces of the comparatively thick rim 36 of the pump head 32 in any suitable manner. Since the faces 40 of the vanes are coplanar with the opposite faces of the comparatively thick rim 36 of the pump head, it will be seen that the end rings or disks 44 act as end guides for the vanes 39 in the slots 38. Each of these rings or disks 44 is centrally apertured to receive the input shaft 30. A pair of loose rings 46 is arranged in the pair of annular chambers 48 provided within the pump head 32 between its comparatively thin hub 35 and each of the end rings or disks 44. These loose rings 46 engage the inner extremities of the legs 42 of the vanes 39 and the opening through each of these rings is substantially greater than the diameter of the input shaft 30 which they embrace so that these loose rings 46 and vanes 39 are permitted to gyrate in eccentric relation to the axis of the input shaft 30.

The outer rounded faces 41 of the vanes 39 contact the bore of a cylinder 50 which is held between pump casing end heads 51 and 52, the pump casing end heads 51 and 52 being secured to the cylinder 50 so that these parts rotate in unison. The hub 53 of the end head 52 is fitted on the driven or output shaft 31 and abuts against a flange 54 on this shaft. This hub 43 is shown as secured to this flange by screws 55 and hence it will be seen that the pump casing or cylinder assembly 50, 51, 52 rotates with the driven or output shaft 31. The hub 56 of the end head 51 of this cylinder assembly carries a bearing 58 in which the drive or input shaft 30 is journaled.

Each end ring or disk 44 is fitted into a recess provided in the corresponding pump casing end head 51, 52 so that these end rings 44, pump casing end heads 51, 52, and the cylinder 50 form the working chamber 59 for the pump head 32 and its vanes 39. This cylindrical working chamber 59 is in eccentric relation to the axis of the input and output shafts 30, 31.

An important feature of the invention resides in the provision of a pair of taper roller bearings 61 between the input shaft 30 and the pump casing or cylinder assembly 50, 51 and 52 which is fast to the output shaft 31 as above described. These taper roller bearings 61 are in opposed relation to each other and not only serve to resist axial thrust of the input and output shafts but also resist radial movement of these shafts relative to each other, large radial forces being created by the pressures built up within the pump connecting the ends of these shafts. To house this pair of taper roller bearings 61 each of the end heads 51, 52 is provided with a coaxial cylindrical recess 62 on the side of the corresponding end ring 44 opposite from the working chamber 59. Each taper roller bearing comprises an outer race 63 fitted in the corresponding cylindrical recess 62 and having an inwardly facing tapered or conical raceway, an inner race 64 fitted around the input shaft 30 and having an outwardly facing tapered or conical raceway, and a series of tapered roller bearings 65 riding in these raceways. The tapered or conical raceways of the races of the two bearings 61 are in opposed relation so that a projection of the surfaces of companion raceways of the two bearings intersects a vertical medial plane through the pump, and hence it will be seen that they resist end thrust between the input shaft 30 and the pump casing or cylinder assembly 50, 51, 52 in both axial directions and since this casing or assembly is fast to the driven or output shaft 31, it will be seen that these thrust bearings 61 resist endwise thrust of these shafts. Equally important, however, is the fact that these taper roller bearings resist radial or lateral forces. The pump develops heavy off-center pressures and hence heavy lateral or radial forces develop between the pump casing or cylinder assembly 50, 51, 52 and the input shaft 30. These radial forces are adequately resisted by the taper roller bearings 61. The bearings 61 between the input and output shafts are therefore built into the hydraulic transmission connecting these shafts so that external end thrust or radial bearings to resist these forces are unnecessary. The necessity for such bearings external of the transmission to resist end thrust and radial forces developed within the transmission has been one of the principal disadvantages of transmissions of this type as heretofore developed.

The working chamber 59 has an elongated inlet groove or port 68 extending circumferentially along the lower part of the working face of the cylinder 50 and has an elongated outlet groove or port 69 extending circumferentially along the upper part of the working face of the cylinder 50. These ports extend, respectively, along the enlarging and decreasing moon-shaped parts of the working chamber 59 and which are formed by the eccentric relation of the working chamber 59 with reference to the axis of the pump head 32.

The inlet groove or port 68 is connected by a passage 70 extending through the cylinder 50 and end head 52 to an inlet opening 71 provided through the end face of this end head 52. The outlet groove or port 69 is connected by a passage 72 extending through the cylinder 50 and end head 51 to an annular chamber 73 in the hub 56 of the end head 51 and around the bearing bushing 58 therein. This hub 56 of the end head 51 is provided with an annular series of ports 74 leading from the annular chamber 73 to the cylindrical external face thereof.

On this cylindrical external face of the hub 56 is slidingly mounted a cylindrical valve sleeve 75 which is movable to cover and uncover the ports 74 to the desired degree. This valve sleeve 75 is provided with an annular peripheral groove 76 which receives a pair of coaxial rollers 77 rotatably mounted on pins 78 carried at the ends of the arms of a depending yoke 79. The central part of this yoke is fast to a horizontal rock shaft 80 which is suitably journaled in the casing 15, as best shown in Fig. 6, and extends exteriorly thereof, suitable oil seals 81 being provided to prevent the escape of the working liquid. This rock shaft 80 can be oscillated to actuate the valve sleeve 75, by any suitable linkage, a rock lever being shown in dotted lines at 82 for this purpose.

In order to prevent undue churning of the working liquid contained within the casing 15, a cup-shaped cylindrical sheet metal end head 83 is fitted over the end head 51, this sheet metal end head 83 being centrally apertured to fit around the valve sleeve 75. A similar cup-shaped cylindrical sheet metal end head 84 is fitted over the end head 52, this sheet metal end head 84 being provided with a central opening 85 of sufficient size to permit ready flow of the working liquid from the casing 15 to the inlet port 71.

A feature of the invention resides in the provision of a simple form of governor to maintain a constant speed of the driven or output shaft 31 regardless of the speed of the driving or input shaft 30. For this purpose a paddle 88 is arranged lengthwise of the input and output shafts 30, 31 within the upper generally rectangular part 19 of the casing 15 and is hung from pivot pins 89, these pivot pins extending coaxially through the opposite end walls of the upper generally rectangular part 19 of the casing 15 and supporting the opposite ends of the paddle 88 near the upper edge thereof. A pin 90 having a ball head projects outwardly from one side of the paddle 88, as best shown in Fig. 5, and the end of this pin is connected by a link 91 with a similar pin 92 projecting outwardly from a lever arm 93, as best shown in Figs. 4 and 5. This lever arm 93 is fast to the rock shaft 80 and projects upwardly therefrom. The movement of the lever arm 93 is limited by a bracket 94 secured to one side of the generally rectangular part 19 of the casing 15 and having a flange 95 projecting toward the lever arm 93, this flange being provided with a recess 96 in which the lever arm 93 works. In the normal closed position of the valve sleeve 75 the lever arm 93 engages the left hand extremity of the recess 96 as viewed in Fig. 4, this recess thereby providing a stop for the closing movement of the sleeve valve mechanism. The movement of this sleeve valve mechanism in the opposite direction is limited by the right hand extremity of the recess 96, as viewed in Fig. 4.

The action of the paddle 88 as a governor is dependent upon the movement of the liquid in the casing 15 as induced by the rotation of the pump assembly which connects the input or drive shaft 30 with the output or driven shaft 31. To provide a generally linear response of the paddle to the rotation of this pump assembly, it is desirable to provide a flange 89 which extends the full length of this paddle and projects in opposed relation to the movement of the working liquid, this movement being indicated by the arrow shown in Fig. 5.

In order to adjust the paddle 88 to provide any desired speed of the output shaft 31, the paddle is provided with an adjustable counterweight. For this purpose an L-shaped bracket 98 is secured to that side of the paddle 88 opposite from the flange 98 so as to provide a horizontal shelf thereon. On this shelf is seated a plunger 100 which is slidingly mounted in a guideway 101 provided in the cover 20, as best shown in Fig. 3. This plunger extends exteriorly of the cover and a counterweight 102 is removably secured to its upper end. This removal is shown as effected by a set screw 103 which secures the counterweight 102 to the plunger 100. It will be seen that by removing the counterweight 102 and substituting a heavier or lighter weight, movement of the paddle 88 induced by the working liquid within the casing 15 will be restricted to a greater or less degree and that hence its action in actuating the valve sleeve 75 will be adjusted accordingly.

*Operation*

In the operation of the transmission, the reservoir provided by the casing 15 is filled with a working liquid, such as oil, to a point near the cover 20 thereof, this filling being effected by removing the filling plug 21. Assuming that the valve sleeve 75 is in the position shown in Fig. 3, in which it completely covers the ports 74, the liquid to be pumped by the pump assembly cannot escape from the pump assembly and hence the pump assembly connecting the input and output shafts 30, 31 is hydraulically locked so that the driven or output shaft 31 is driven at the same speed as the input or drive shaft 30.

To manually reduce the speed of the driven or output shaft 31 to that desired, the lever 82 is moved in a corresponding direction so as to rock the rock shaft 80 (Fig. 6) and swing the yoke 79 in a corresponding direction. The rollers 77 at the ends of the arms of the yoke 79 are arranged in the groove 76 of the valve sleeve 75 and this movement of this yoke moves this valve sleeve 75 to the left as viewed in Fig. 3. This movement of the valve sleeve opens the ports 74 through the hub of the end head 51 to a proportionate degree and hence the working liquid is pumped by the pump assembly connecting the input and output shafts 30, 31. In this pumping action the working liquid from the casing 15 enters the central opening 85 in the sheet metal end head 84 and passes into the inlet opening 71 of the end head 52. From this inlet opening 71 the working liquid passes through the passage 70 into the elongated groove or port 68 within the working chamber 59. This oil is drawn by the vanes 39 into the working chamber 59 by reason of the eccentric relation of this cylindrical working chamber to the axis of the input and output shafts 30, 31, these vanes, along the inlet groove or port 68 providing a series of enlarging chambers as in any conventional vane type pump. In passing above the center of the pump these chambers between the vanes 39 contract and hence the working liquid is pumped out through the elongated groove or outlet port 69 in the upper side of the working chamber 59. From this groove or outlet port 69 the working liquid passes through the passage 72 into the annular chamber 73 provided in the hub 56 around the bearing bushing 58 and thence escapes through the partially opened outlet ports 74 back into the main body of working liquid within the casing 15. It will be seen that by opening these ports 74 through an uncovering action of the valve sleeve 75 a degree of slippage is provided between the drive or input shaft 30 and the driven or output shaft 31 so that a differential in their speeds is provided; the speed of the output or driven shaft 31 being reduced. The speed of the driven or output shaft 31 is dependent upon this degree of slippage and hence it will be seen that any desired reduced speed of the driven or output shaft 31 can be obtained by moving the valve sleeve 75 to uncover the ports 74 to a corresponding degree.

In the action of the pump assembly which connects the input and output shafts 30, 31 it will be seen that the vanes 39 are maintained in constant contact with the working surfaces of the cylinder 50 by the pair of loose rings 49 which engage the inner extremities of the legs 42 of these vanes, these rings rotating in eccentric relation to the axis of the drive or input shaft 31 and being of such size as to insure contact between the vanes and the eccentric working surface of the cylinder 50. These vanes 39 are held against endwise displacement by the disks or rings 44 and by the hub 35 of the pump head 32 which the legs 42 of these vanes straddle.

It will be particularly noted that the taper roller bearings 61 are arranged internally of the pump and serve to resist both radial and axial forces developed therein. Thus, these bearings are between the input shaft 30 and the pump casing or cylinder assembly 50, 51 and 52 fast to the driven shaft and hence resist lateral forces between this pump casing or cylinder assembly and the pump head 32 and vanes 39 carried by the input shaft. Since the pressures developed by the pump are off-center and of considerable magnitude, this action of the bearings 61 is of importance. Further, by reason of their tapered form, these bearings 61 resist axial thrust of the input and output shafts. This avoids the necessity of providing large bearings between the pump and the casing to resist such forces.

The action of the governor is as follows:

Assuming that it is desired to have a constant speed of the driven or output shaft 31 regardless of the speed of the input shaft 30, the counterweight 102 on the plunger 100 is selected to obtain this result. As long as the driven or output shaft 31 rotates, the pump assembly within the casing 15 rotates in the direction of the arrow shown in Fig. 5. This rotation of the transmission causes the working liquid within the casing 15 to impinge against the paddle 88 and thereby swing it to the left, as viewed in Fig. 5. This movement of this paddle causes it to draw upon the link 91 and thereby rotate the lever arm 93 clockwise, as viewed in Fig. 4. This rotates the rock shaft 80 clockwise, as viewed in Fig. 3, this moving the yoke or fork 79 fast to this rock shaft to the left, as viewed in Fig. 3, so as to uncover the ports 74 to a greater degree. The uncovering of the ports 74 to a greater degree thereby increases the degree of slippage in the transmission and causes the transmission assembly to rotate at a slower speed, the maximum speed of rotation of this transmission assembly being, of course, when the ports 74 are completely closed and the transmission hydraulically locked. In consequence of this increase in the effective opening of the ports 74, the rotation of the driven or output shaft 31 and the transmission housing fast thereto is decreased so that the action of the working liquid against the paddle 88 is reduced and the paddle 88 swings back to the position corresponding to the speed of the output shaft 31 which it is set to maintain. If a higher output speed is desired, a lighter weight 102 would be fixed to the plunger 100, and if a slighter output speed is desired this weight would be increased.

From the foregoing it will be seen that the present invention is a very simple and inexpensive heavy duty transmission and in which all thrust forces are adequately compensated. It will further be seen that the transmission has a very simple governor which serves to maintain, within very close limits, and in a very simple manner, any desired output speed of the transmission.

I claim:

1. In a transmission having a casing adapted to contain a body of working fluid, a power input shaft extending into said casing, a power output shaft extending into said casing, a pump connecting said shafts and having a part rotating with said output shaft and immersed in said working fluid and pumping said working fluid from said body of working fluid back into said body of working fluid, and a throttling valve for said pump, the combination therewith of a governor for maintaining a maximum speed of said output shaft, comprising a paddle arranged in said body of working fluid adjacent said rotating part in position to be deflected in response to the movement of said working fluid induced by the rotation of said rotating part, and means operatively connecting said paddle and throttling valve to open said throttling valve in response to increasing deflection of said paddle.

2. In a transmission having a casing adapted to contain a body of working fluid, a power input shaft extending into said casing, a power output shaft extending into said casing, a pump connecting said shafts and having a part rotating with said output shaft and immersed in said working fluid, and pumping said working fluid from said body of working fluid back into said body of working fluid, and a throttling valve for said pump, the combination therewith of a governor for maintaining a maximum speed of said output shaft, comprising a paddle pivoted in said casing with a free end arranged in said body of working fluid adjacent said rotating part in position to be deflected in response to the movement of said working fluid induced by the rotation of said rotating part, and means operatively connecting said paddle and throttling valve to open said throttling valve in response to increasing deflection of said paddle.

3. In a transmission having a casing adapted to contain a body of working fluid, a power input shaft extending into said casing, a power output shaft extending into said casing, a pump connecting said shafts and having a part rotating with said output shaft and immersed in said working fluid and pumping said working fluid from said body of working fluid back into said body of working fluid, and a throttling valve for said pump, the combination therewith of a governor for maintaining a maximum speed of said output shaft, comprising a paddle arranged in said body of working fluid adjacent said rotating part in position to be deflected in response to the movement of said working fluid induced by the rotation of said rotating part, means operatively connecting said paddle and throttling valve to open said throttling valve in response to increasing deflection of said paddle, and adjustable means biasing said paddle to a position holding said throttling valve in a closed position.

4. In a transmission having a casing adapted to contain a body of working fluid, a power input shaft extending into said casing, a power output shaft extending into said casing, a pump connecting said shafts and having a part rotating with said output shaft and immersed in said working fluid and pumping said working fluid from said body of working fluid back into said body of working fluid, and a throttling valve for said pump, the combination therewith of a governor for maintaining a maximum speed of said output shaft, comprising a paddle pivoted in said casing with a free end arranged in said body of working fluid adjacent said rotating part in position to be deflected in response to the movement of said working fluid induced by the rotation of said rotating part, means operatively connecting said paddle and throttling valve to open said throttling valve in response to increasing deflection of said paddle, and adjustable means biasing said paddle to a position holding said throttling valve in a closed position, comprising a member operatively connected with said paddle to move therewith and a counterweight on said member.

5. In a transmission having a casing adapted to contain a body of working fluid, a power input shaft extending into said casing, a power output shaft extending into said casing, a pump connecting said shafts and having a part rotating with said output shaft and immersed in said working fluid and pumping said working fluid from said body of working fluid back into said body of working fluid, and a throttling valve for said pump, the combination therewith of a governor for maintaining a maximum speed of said output shaft, comprising a paddle pivoted in said casing with a free end arranged in said body of working fluid adjacent said rotating part in position to be deflected in response to the movement of said working fluid induced by the rotation of said rotating part, means operatively connecting said paddle and throttling valve to open said throttling valve in response to increasing deflection of said paddle, and adjustable means biasing said paddle to a position holding said throttling valve in a closed position, comprising a vertical plunger guided by said casing and extending exteriorly thereof, a counterweight removably secured to said plunger externally of said casing, and means operatively connecting the opposite end of said plunger with said paddle to bias it to said position.

6. In a transmission having a transmission casing adapted to contain a body of working fluid, a power input shaft journaled in a wall of said casing, a power output shaft journaled in the opposite wall of said casing in coaxial relation to said input shaft, a pump casing rotating with said output shaft and having a working chamber, a pump rotor in said working chamber and rotating with said input shaft, said pump casing being provided with an inlet passage leading from said body of working fluid to said working chamber and an outlet passage leading from said working chamber back to said body of working fluid, a valve for throttling the passage of said working fluid through said passages, the combination therewith of a governor for maintaining a maximum speed of said output shaft, comprising a paddle pivoted to said casing along an axis extending generally parallel with said shafts and having its free end arranged in said body of working fluid and adjacent said pump casing to be deflected in response to the movement of said working fluid induced by the rotation of said pump casing, and means operatively connecting said paddle and throttling valve to open said throttling valve in response to increasing deflection of said paddle.

7. In a transmission having a transmission casing adapted to contain a body of working fluid, a power input shaft journaled in a wall of said casing, a power output shaft journaled in the opposite wall of said casing in coaxial relation to said input shaft, a pump casing rotating with said output shaft and having a working chamber, a pump rotor in said working chamber and rotating with said input shaft, said pump casing being provided with an inlet passage leading from said body of working fluid to said working chamber and an outlet passage leading from said working chamber back to said body of working fluid, and a valve for throttling the passage of said working fluid through said passages, the combination therewith of a governor for maintaining a maximum speed of said output shaft, comprising a paddle pivoted to said casing along an axis generally parallel with said shafts and directly above said pump casing and having a depending free end arranged in said body of working fluid and adjacent said pump casing to be deflected from a normal vertical position in response to the movement of said working fluid induced by the rotation of said pump casing, means operatively connecting said paddle and throttling valve to open said throttling valve in response to increasing deflection of said paddle from said normal vertical position and adjustable means biasing said paddle toward said normal vertical position.

8. In a transmission having a transmission casing adapted to contain a body of working fluid, a power input shaft journaled in a wall of said casing, a power output shaft journaled in the opposite wall of said casing in coaxial relation to said input shaft, a pump casing rotating with said output shaft and having a working chamber, a pump rotor in said working chamber and rotating with said input shaft, said pump casing being provided with an inlet passage leading from said body of working fluid to said working chamber and an outlet passage leading from said working chamber back to said body of working fluid, and a valve for throttling the passage of said working fluid through said passages, the combination therewith of a governor for maintaining a maximum speed of said output shaft, comprising a paddle pivoted to said casing along an axis generally parallel with said shafts and directly above said pump casing and having a depending free end arranged in said body of working fluid and adjacent said pump casing to be deflected from a normal vertical position in response to the movement of said working fluid induced by the rotation of said pump casing, means operatively connecting said paddle and throttling valve to open said throttling valve in response to increasing deflection of said paddle from said normal vertical position and adjustable means biasing said paddle toward said normal vertical position, comprising a member projecting horizontally outward from the side of said paddle opposite from that against which said working fluid impinges, a vertical plunger having its lower end supported on said projection and extending exteriorly of said casing, and a counterweight supported by said plunger.

9. In a transmission having an input shaft and a coaxial output shaft, a pump casing fast to one of said shafts and journaled on the other of said shafts and providing a cylindrical working chamber arranged eccentrically with reference to the axis of said shafts and providing inlet and outlet passages leading, respectively, to oppositely located inlet and outlet grooves extending circumferentially along said working chamber, said other of said shafts extending through said working chamber, a working fluid reservoir connecting said inlet and outlet passages and means for throttling the passage of said working fluid through said passages, the combination therewith of a pump rotor fast to said other of said shafts and arranged in said working chamber, comprising a pump head having a central hub which is relatively thin in an axial direction and a centered rim which is relatively thick in an axial direction and radially slotted, a plurality of vanes in said slots each bifurcated to straddle said hub, a pair of circular disks apertured to fit said other of said shafts and fitted against opposite sides of the rim of said pump head and forming a pair of annular chambers therein, and means holding said vanes in engagement with the cylindrical working face of said working chamber, comprising a circular, loose ring in each of said annular chambers and loosely encircling said other of said shafts to be bodily movable radially relative thereto and engaging the end of the bifurcations of said vanes.

ROBERT H. CARSON.

REFERENCES CITED

The following references are of record in the file of this patent:

UNITED STATES PATENTS

| Number | Name | Date |
|---|---|---|
| 890,533 | Schumucker | June 9, 1908 |
| 1,913,758 | Hopkins | June 13, 1933 |
| 2,009,507 | Matthews | July 30, 1935 |
| 2,031,749 | Vincent | Feb. 25, 1936 |
| 2,076,887 | Gambrell | Apr. 13, 1937 |
| 2,195,901 | Owens | Apr. 2, 1940 |
| 2,313,049 | Cook | Mar. 9, 1943 |
| 2,366,765 | Anderson | Jan. 4, 1945 |
| 2,371,942 | Armstrong | Mar. 20, 1945 |
| 2,426,491 | Dillon | Aug. 26, 1947 |
| 2,460,047 | Von Wangenheim | Jan. 25, 1949 |